March 21, 1933.                G. E. ROWE                 1,902,140
                    MANUFACTURE OF HOLLOW GLASSWARE
                Original Filed Sept. 30, 1929    2 Sheets-Sheet 1
Fig. 1.             Fig. 2.              Fig. 3.
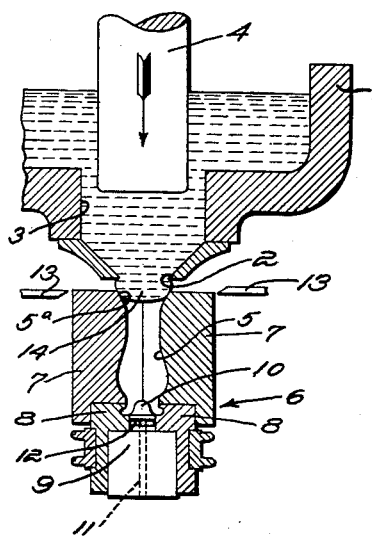
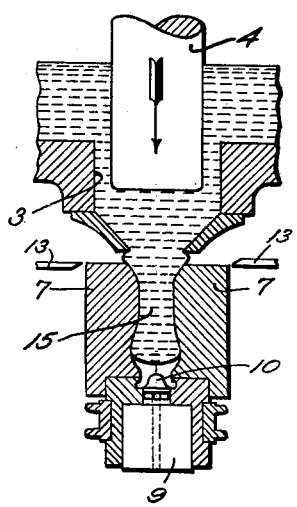
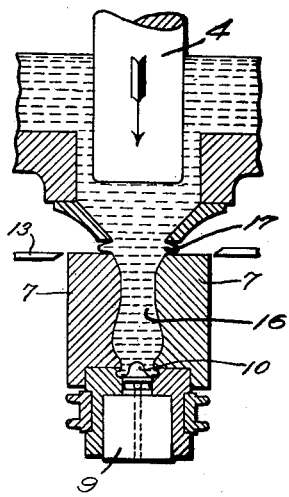
Fig. 13.
Fig. 4.             Fig. 5.
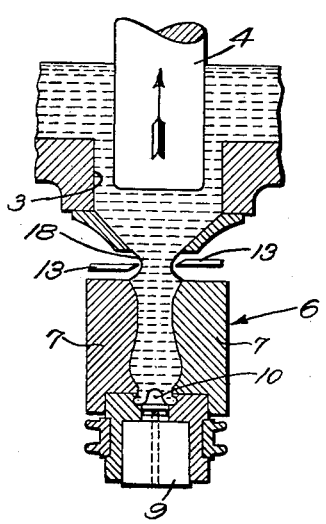
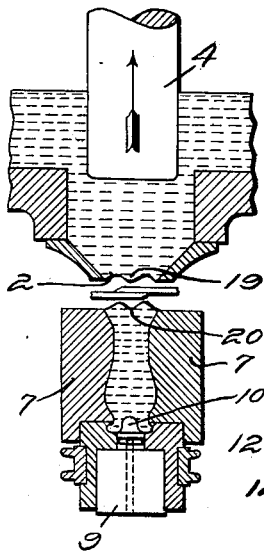
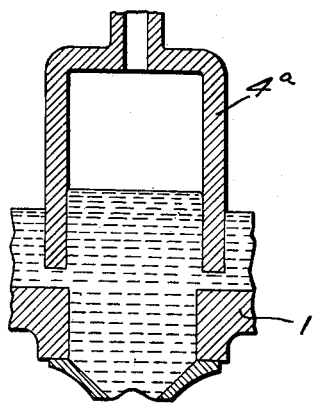
Fig. 12.
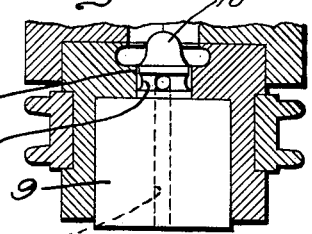
Witness:
Jas. G. White
Inventor
George E. Rowe
By Brown & Parham
Attorneys March 21, 1933.  G. E. ROWE  1,902,140
MANUFACTURE OF HOLLOW GLASSWARE
Original Filed Sept. 30, 1929    2 Sheets-Sheet 2
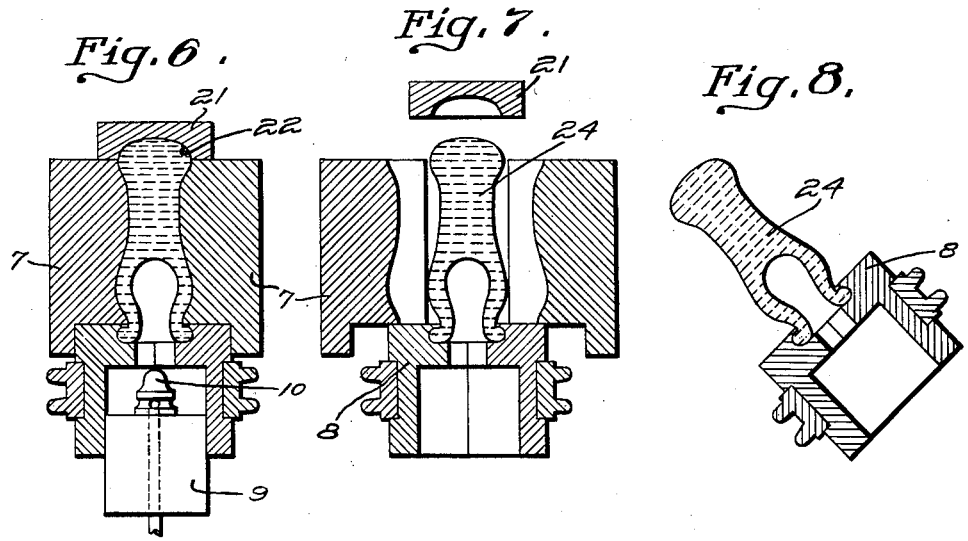
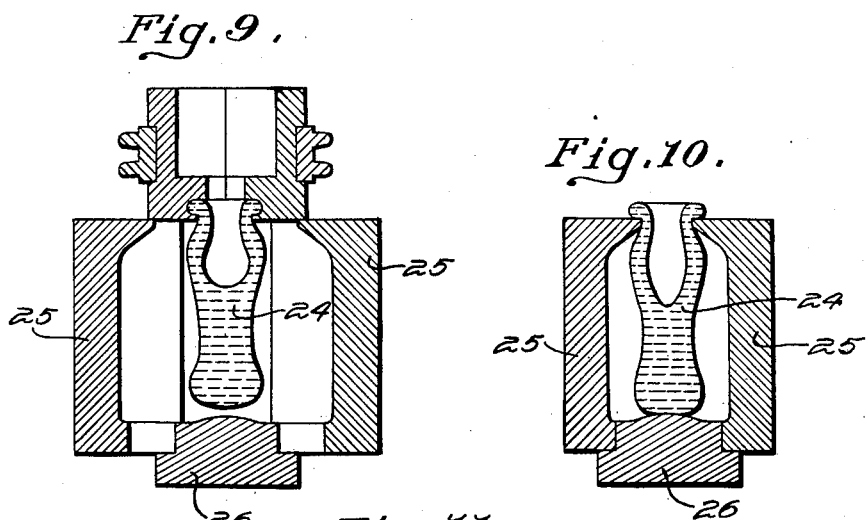
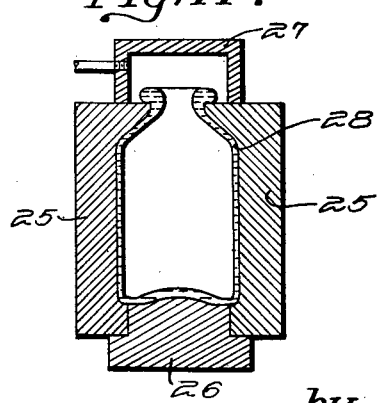
Witness:
Jas. G. White
Inventor
George E. Rowe
by Brown & Parham
Attorneys Patented Mar. 21, 1933

1,902,140

UNITED STATES PATENT OFFICE

GEORGE E. ROWE, OF WETHERSFIELD, CONNECTICUT, ASSIGNOR TO HARTFORD-EMPIRE COMPANY, OF HARTFORD, CONNECTICUT, A CORPORATION OF DELAWARE

MANUFACTURE OF HOLLOW GLASSWARE

Application filed September 30, 1929, Serial No. 396,242. Renewed June 10, 1932.

This invention relates generally to the manufacture of hollow glassware and more particularly to the manufacture of such glassware from molten glass that is fed through a discharge outlet of a container into a preliminary shaping or parison mold or glass receiver that is disposed in working alignment with the outlet.

The present invention provides improved apparatus and a novel method for combining and coordinating features relating to the forced feeding of glass from a discharge outlet into an underlying parison mold or glass receiver, the application of suction within the charge receiver to facilitate the filling of the latter and the attenuation of the connecting glass between the charge receiver and the outlet with hereinafter described additional features, whereby the underlying parison mold or charge receiver may be filled to its full capacity in a better manner than has heretofore been possible. The invention therefore is adapted to produce a glass blank or parison which, by reason of the manner of its production and its physical characteristics, is well adapted for fabrication into a practically perfect article of glassware.

The present invention contemplates the use of a furnace extension, forehearth or other receptacle for molten glass, having a discharge outlet in its base continuously submerged by molten glass. A parison mold or preliminary shaping receiver is arranged for movement in axial alignment with the discharge outlet and also for movement laterally to and from a position in line with said outlet. The discharge of glass through the outlet, according to the present invention, is controlled by suitable means for applying an extrusive pressure to the discharging glass during the filling of the underlying parison mold or glass receiver and for applying a retarding or retractive impulse to the glass in and below the outlet after the filling of the charge receiver has been effected. A suitable means is to be provided for producing a selected variable degree of vacuum within the charge receiver at a selected variable time in the cycle of operations of the mechanism for loading the charge receiver and also for applying positive or superatmospheric pressure to the glass therein when desired, to aid in the preliminary blowing or expansion of the glass parison.

The present invention contemplates the selection of a parison mold or charge receiver and a discharge outlet of the glass feeding container of such sizes and configurations with relation to each other that the lower end of the downwardly moving discharged glass from the outlet will contact with the internal surface of the upper end of the glass receiver and not only seal the cavity of the glass receiver but engage with the inner surface of the upper end thereof so as to remain in lateral non-sliding contact therewith during the loading of the charge receiver. A vertically reciprocating discharge regulating implement is of such size in respect to the size of the outlet and of the portion of the glass container adjacent thereto and is so operated that the accelerated downward movement of glass during the loading of the charge receiver is at a rate greater than would be caused by gravity alone while the retractive action on the glass between the charge receiver and the outlet after the charge receiver has been loaded and is moving downward will cause a rapid attenuation of the glass between the charge receiver and the outlet and, after the severance of the attenuated glass, the quick retraction of the glass stub upward, preferably completed above the plane of the lower end of the outlet. It also is a feature of the use of one embodiment of the present invention to cause during the cycle of operations for the loading of a charge receiver, the discharge and accelerated downward movement from the outlet of more glass than is required to completely fill the cavity of the charge receiver. After the contact of the lower end of the downwardly moving column of discharged glass with the upper end of the cavity of the charge receiver, the further accelerated downward movement of glass will cause glass to be forced downwardly at and outwardly from the center of the column so that the cavity of the charge receiver will be filled with glass under pressure without causing any portion of such glass to slide in contact with the inner wall of the cavity. In other words, glass is pushed from the relatively hot central portion of the column into contact with the particular portion of the inner wall of the cavity against which it will remain during the entire loading operation. Preferably, the extreme upper end of the cavity of the charge receiver is flared outwardly and upwardly and has a diameter at its larger or upper edge approximately the same as the diameter of the lower end of the discharge outlet, thus providing a tapering annular surface of decreasing diameter at the upper end of cavity of the charge receiver for contact with the lower end of the descending glass column. The surface portion of the column of glass, on coming in contact with the relatively cool wall of the mold, will be chilled, thereby producing an outer layer of relatively stiff glass which will encompass the hotter and more fluid glass at the center of the column. The chilled surface glass will remain in non-sliding contact with the portion of the mold wall by which it was chilled. The pressure on the hotter glass at the center of the column will cause such movement of glass therefrom into the lower part of the mold as will assure the filling of the remainder of the mold cavity without sliding movement of any part of the surface thereof in contact with any part of the wall of the mold cavity. It is believed, from observation of results of tests of the invention, that the pressure from above on the hot relatively fluid glass within the chilled surface glass in contact with the wall of the upper part of the mold cavity will cause the lower part of the mold cavity to be filled progressively by hot glass that will be forced generally downwardly but which will form a mass that will extend laterally against the side walls of the lower part of the mold cavity, the cohesive attraction of the glass particles of the mass probably aiding in the accomplishment of this result. Irrespective of whether or not the lateral extent of the mass of glass in the lower part of the mold cavity is sufficient to cause contact thereof with the side walls of the lower part of the mold cavity before contact of the lower part of the mass with the bottom of the mold cavity, each surface portion of such mass will remain in non-sliding contact with the particular portion of the side wall of the mold cavity against which it is first moved and by which it will be chilled. Also, the discharge outlet of the glass receptacle preferably is provided at the lower end of a well of substantially greater diameter than the outlet and the vertically reciprocating glass discharge regulating implement that is used in contact with the glass in the receptacle preferably has its lower end depending into the well and is of ample size and so reciprocated as to produce the required acceleration and retardation of discharge of glass from the outlet to effect the desired forced feeding or loading of the charge receiver and the desired retractive action on the glass after the charge receiver has been filled.

I also have discovered that the time of application of the suction within the cavity of the charge receiver with respect to the time of completion of the forced filling thereof may be utilized to aid in the production of a superior "full" blank or parison. It has been proposed heretofore to produce partial vacuum or suction within the charge receiver practically as soon as the charge receiver was sealed at its upper end by the entrance of the lower end of the glass column therein, this having been considered to be desirable to utilize the effect of the suction on the glass as required to draw the glass downwardly in the mold to aid in causing such glass to fill the lower portion of the mold cavity. This early application of the vacuum or suction tends to prevent the production of the superior glass blank or parison heretofore mentioned, probably because the suction acts to draw the lower end of the advancing column of glass downwardly in sliding contact with the inner wall of the mold cavity. However, according to the present invention, the suction within the cavity of the charge receiver is not applied until a substantial portion of the cavity of the charge receiver has been filled by the forced feed of glass from the center of the glass column in the manner hereinbefore described, and preferably not until the downward movement or rate of filling of the cavity of the charge receiver has decreased or tends to decrease, as because of a substantial change of the inner diameter of the charge receiver, because of the contact of part of the glass therein with an upwardly projecting neck finish plunger at the lower end of the cavity, or because of the tendency of the flow of glass at the center of the mold to decrease as the resistance thereto from the glass at the sides of the mold increases and the effect thereon of the downward movement of the plunger becomes less. The suction then aids in effecting the filling of the lower end or neck finish part of the parison mold without causing downward sliding or translatory movement of the glass within the cavity.

After the forced loading of the charge receiver or parison mold in the improved manner, above described, the continued downward forcing of glass from the outlet will cause a pressure on the glass in the charge receiver and lateral distention or swelling of the glass between the outlet and the upper end of the charge receiver if the latter is spaced below the outlet. The distended or laterally swelled glass may have a diameter greater than that of the upper end of the charge receiver and also of the discharge outlet. After this distention or swelling of the connecting glass occurs, the filled charge receiver may be moved downwardly and simultaneously with such downward movement, a retractive impulse preferably is applied to the glass in the outlet. As stated, the suction is applied late in the loading cycle, preferably just before the beginning of the downward movement of the charge receiver. Such suction therefore serves primarily as a force that aids in forming the neck finish portion of the parison and in holding the glass down in the mold rather than as a force that is utilized to any substantial extent in the general loading of the mold. The application of the suction to the glass preferably endures from 15 to 25% of the portion of the loading time prior to shearing. The forces acting oppositely on the connecting glass between the charge receiver and the outlet cooperate to attenuate the glass rapidly by stretching the laterally distended or enlarged portion of glass to reduce the diameter thereof without pulling the glass at the upper end of the cavity of the charge receiver away from the wall thereof. When the desired attenuation of the glass between the charge receiver and the outlet has been effected so that the diameter thereof is substantially less than the diameter it had when laterally swelled and preferably less than the diameters of both the discharge outlet and the adjacent end of the mold cavity, such attenuated glass is severed, as by the action of mechanical shears, and the glass stub above the plane of severance is retracted into the outlet and preferably is maintained above the plane of the lower end of the outlet for a substantial portion of the period between the severance of glass in successive loaded molds, as from 40 to 60% thereof, to permit adequate reheating and reassimilation of any chilled portions thereof by the adjacent hot glass and ample time for the removal of the loaded mold and the proper positioning of a new charge receiver or parison mold beneath the outlet. The actual loading of the parison mold in the manner just described thus requires but a relatively small part of the time between the loading of successive molds preferably not less than 25% nor more than 50% of such time.

The upper end of the parison mold or other charge receiver may be spaced below the outlet when such charge receiver is at its highest position and is being loaded or may have been elevated close to or against the outlet, the loaded mold being lowered and the connecting glass being attenuated substantially as described to permit the severance of the attenuated glass at a plane spaced below and out of smearing relation with the outlet.

The glass blank or parison in the charge receiver then may be given a preliminary or partially expanded shape therein and then transferred to a finishing mold in which it may be blown or otherwise fabricated into the finished article or hollow glassware.

A description of the steps of the method for carrying out the present invention and of apparatus adapted for use in the performance of such steps will now be given with reference to the accompanying drawings, in which Figures 1 to 11, inclusive, are more or less diagrammatic fragmentary vertical sectional views of an apparatus adapted for use in the performance of the invention, the respective views illustrating different stages in the manufacture of a complete article of hollow glassware from a charge of glass delivered from the discharge outlet of a glass container into an underlying parison mold;

Fig. 12 is a fragmentary sectional detail view of a part of the apparatus shown in the preceding views, and showing particularly appropriate means for applying suction to the cavity of the glass charge receiver or parison mold and for determining the configuration of the neck portion or finish of the parison; and Fig. 13 is a fragmentary vertical sectional view, showing a modified form of means for applying extrusive and retractive impulses to the glass at the outlet.

Referring now to the drawings, and particularly to Figs. 1 to 12, inclusive, thereof, the numeral 1 designates a receptacle for a supply body of molten glass. This receptacle or container 1 may be an extension or forehearth portion of a melting furnace and in actual practice may be provided with burners, (not shown), and suitably constructed to maintain the glass therein at the desired temperature and in the desired condition for feeding through a discharge outlet 2 in the base of the supply container. The discharge outlet 2 is shown as being formed at the lower end of a well 3 and as having a diameter substantially less than that of the major portion of the well. A discharge regulating implement 4 depends into the well 3 and is reciprocable vertically with a stroke which may be adjusted as to position, amplitude, speed of movement, etc., to produce the desired expulsive and retractive or retarding impulses on the glass at the outlet. The implement 4 preferably is of substantial area in cross section, as is the well 3, so that the downstroke of the implement will result in the forced discharge from the outlet 2 of a quantity of glass which is more than sufficient to completely fill the cavity 5 of a glass discharge receiver or parison mold, designated generally at 6, spaced below and in line with the outlet. The parison mold 6 preferably comprises a pair of partible body sections 7 cooperative with a pair of partible neck ring sections 8 and with a neck finish plunger 9 which is slidable in the bore of the neck ring and has its tip 10 projecting into the glass receiving cavity of the parison mold when the latter is in its glass receiving position and is being filled with glass, as indicated in Figs. 1 to 5, inclusive. The neck finish plunger 9 may have a central bore 11 communicating at its upper end with an annular groove 12 which in turn communicates through an annular space 12' between the neck finish plunger and the adjacent wall of the neck ring with the neck finish portion of the cavity of the parison mold when the neck finish plunger is raised, as best seen in Fig. 12. The bore 11 may be and preferably is adapted for connection with any suitable means (not shown) whereby subatmospheric and superatmospheric pressures may be produced selectively and to any desirable extent within certain limits within the cavity of the parison mold.

It is intended that the parison mold shall be supported by mechanism whereby it may be moved periodically to and from a position below and in alignment with the discharge outlet 2 and vertically in alignment with the discharge outlet 2 for purposes to be presently stated. The supporting and operating mechanism for the parison mold is not shown because it is well within the knowledge of those skilled in the art to provide such mechanism whenever required.

The body or major portion of the glass receiving cavity within the parison mold may have any required configuration, according to the shape of the parison that is to be formed therein. The extreme upper end of the cavity of the parison mold preferably is enlarged or upwardly flaring, as indicated at 5a, so that the extreme upper edge of this cavity and the diameter of the discharge outlet 2 will be approximately the same.

The apparatus for carrying out the invention preferably includes a pair of cooperative shear blades 13, supported and operated by suitable mechanism (not shown) to close periodically at an adjustable time and at a predetermined adjustable distance from the plane of the lower end of the outlet, to sever the glass between the parison mold and the glass in the outlet. Mechanisms for supporting and operating shear blades in this manner are now well known in the art.

With the illustrated parts of the improved apparatus in the position shown in Fig. 1, the discharge regulating implement 4 has commenced its downward movement and the lower end of the discharging column of glass 14 has contacted with the flaring walls of the extreme upper end portion of the cavity of the parison mold and provides a seal for such cavity. The neck finish plunger 9 is in its raised position and the parison mold is in line with the outlet and has been raised adjacent thereto but is in spaced relation therewith. In Fig. 2, the downward movement of the plunger 4 has continued and the accelerated downward movement of the discharged glass has progressed so that the plane of the lower end of the glass column within the cavity of the parison mold is relatively adjacent to the lower end of the latter. It is to be noted that the lower end of the column 15 in Fig. 2 is not the lower end of the column 14 of Fig. 1 pushed downwardly in the mold cavity. The contact of the lower end of the column 14 of Fig. 1 with the flaring walls 5a, at the upper end of the mold cavity stopped the downward movement of the outer portion of such glass, on which a skin had formed because of the chilling contact of the atmosphere and of the wall of the mold cavity therewith. As a result, the continued discharge of glass as the plunger moves downward from the position of Fig. 1 to the position of Fig. 2, has caused relatively hot glass to be forced downwardly at the center of the column in a mass that, it is believed, will extend outwardly against the walls of the parison mold cavity while completely filling such portion of the mold cavity throughout its cross section. Thus, the glass column is not slid downwardly in the mold cavity but each portion thereof remains in contact with the particular portion of the cavity with which it first is moved into chilling contact. The glass column within the mold cavity therefore will have a smooth, uniformly chilled surface and thus will have a relatively thin skin formation of uniform thickness and will have substantially symmetrical viscosity, temperature and condition throughout its length.

When the lower end of the glass column within the mold cavity is approximately at the level indicated in Fig. 2, or shortly thereafter, a condition of partial vacuum may be established in the lower end of the mold cavity to aid in filling the neck finish portion of the mold cavity with glass, which glass will be drawn or moved downwardly at the relatively hot central portion of the column without any appreciable sliding or translatory downward movement of the surface glass in the parison mold. Fig. 3 illustrates the mold cavity completely filled by the glass, designated at 16, and shows the connecting glass between the outlet and the mold distended or swelled laterally, as indicated at 17. In Fig. 4, the implement 4 is moving upwardly, retarding or reversing the flow through the outlet 2, and the filled parison mold 6 has been moved downwardly, thereby aiding the action of the plunger 4 in decreasing the diameter of the previously laterally enlarged connecting portion of glass between the mold and the outlet so that such connecting portion or neck is now attenuated, as indicated at 18. The shear blades 13 are closing to sever the attenuated neck.

In Fig. 5 the shears have closed and have severed the attenuated neck of glass. The stub 19 above the shears have been lifted therefrom and above the lower end of the outlet 2 while the severed glass below the shears, consisting largely of glass at the relatively hot central portion of the glass column, has sagged downwardly away from the shears, as indicated at 20. Thus, the cavity of the parison mold is completely filled and contains a charge having a relatively smooth external surface, a skin formation of uniform and relatively slight thickness and an axial symmetrical viscosity and condition.

The remaining steps of the process of forming a finished article of glassware may be varied considerably according to various conditions or particular requirements of service. If desired, a closure plate 21 may be placed on the body of the parison mold so that a cavity 22 therein will supplement the cavity of the body of the parison mold. Superatmospheric pressure may be applied through the lowered parison neck plunger 4 and the bore of the neck ring to the neck finish portion of the glass in the parison mold, thereby producing a bubble 23 and partially expanding the glass parison 24, as shown in Fig. 6. The sections of the parison body mold and the closure plate 20 may be removed from the parison 24, as shown in Fig. 7, leaving the parison supported on the neck ring. Thereafter, the neck ring may be inverted from the position shown in Fig. 7 which will in fact revert the parison to an upright position. After the parison has been thus reverted, as through the position shown in Fig. 8 to the position shown in Fig. 9, the sections 25 of the body of a finishing mold and the bottom plate 26 of the finishing mold may be applied to the body of the parison and the halves of the neck ring mold may be opened and removed, leaving the parison supported in upright position within the closed finishing mold, as shown in Fig. 10. A blow head 27 then may be applied to the finishing mold and the parison may be blown by the application of pressure through the blow head to the final or finished form, indicated at 28 in Fig. 11.

In lieu of the reciprocating solid discharge regulating implement 4, shown in Figs. 1 to 5 inclusive, a hollow plunger or air bell 4a may be used in a manner now well known in the art to control the discharge of glass through the outlet 2 by periodic applications of superatmospheric and subatmospheric pressures on the glass therewithin and above the outlet.

The various features of the invention may be modified as to character, combination and arrangement to adapt the invention to different uses on different conditions of service without departing from the spirit and scope of the invention as set out in the appended claims.

I claim:

1. In the manufacture of hollow glassware, the method of charging a glass receiver having an elongate cavity which comprises disposing the charge receiver in adjacent relation with the lower end of a downwardly opening discharge outlet for molten glass so that said cavity is axially aligned with the outlet, retarding the downward movement of the surface glass at the lower end of a descending column of molten glass from said outlet when said lower end of the column contacts with and seals the upper end of the cavity of the glass receiver and simultaneously forcing glass downwardly from the interior of the column into the cavity of the glass receiver at a rate accelerated beyond that which would result from the action of gravity alone, causing a suction in the lower part of said cavity when the remaining portion of said cavity has been partly filled with glass and while the forced downward feed of glass from the interior of the column is continued, and severing the glass in the receiver from the glass supply when the cavity of said receiver has been completely filled.

2. In the manufacture of hollow glassware, the method of charging a glass receiver having an elongate cavity which comprises disposing the charge receiver in adjacent relation with the lower end of a downwardly opening discharge outlet for molten glass so that said cavity is axially aligned with the outlet, retarding the downward movement of the surface glass at the lower end of a descending column of molten glass from said outlet when said lower end of the column contacts with and seals the upper end portion of the cavity of the glass receiver and simultaneously forcing the glass downwardly through the chilled surface portion of the glass in contact with the upper part of the glass receiver cavity into the remaining part of the cavity of the glass receiver at a rate accelerated beyond that which would result from the action of gravity alone, and severing the glass in the receiver from the glass supply when the cavity of said receiver has been completely filled.

3. In the manufacture of hollow glassware, the method of charging a glass receiver having an elongate cavity which comprises disposing the charge receiver in adjacent relation with the lower end of a downwardly opening discharge outlet for molten glass so that said cavity is axially aligned with the outlet, retarding the downward movement of the surface glass at the lower end of a descending column of molten glass from said outlet when said lower end portion of the column contacts with and seals the upper end portion of the cavity of the glass receiver and forcing glass downwardly from the interior of the column through said retarded surface portion thereof and into the remaining portion of the cavity of the glass receiver at a rate accelerated beyond that which would result from the action of gravity alone, causing a suction in the lower part of said cavity when the remaining portion of said cavity has been partly filled with glass and while the forced downward feed of glass from the interior of the column is continued, causing a rapid lateral swelling of the glass above the receiver when the cavity of the latter has been filled, then quickly attenuating the previously swollen portion of glass above the receiver by moving the receiver axially downward from the outlet while exerting a retractive force on the glass adjacent to the outlet, and severing the attenuated glass at a plane close to and above the glass receiver.

4. In the manufacture of hollow glassware, the method of charging a glass receiver having an elongate cavity which comprises disposing the charge receiver in adjacent relation with the lower end of a downwardly opening discharge outlet for molten glass so that said cavity is axially aligned with the outlet, retarding the downward movement of the surface glass at the lower end of a descending column of molten glass from said outlet when said lower end portion of the column contacts with and seals the upper end portion of the cavity of the glass receiver and forcing glass downwardly from the interior of the column through said retarded surface portion of the column into the remainder of the cavity of the glass receiver at a rate accelerated beyond that which would result from the action of gravity alone, causing a suction in the lower part of said cavity when the remaining portion of said cavity nas been filled with glass and while the forced downward feed of glass from the interior of the column is continued, causing a rapid lateral swelling of the glass above the receiver when the cavity of the latter has been filled, then quickly attenuating the previously swollen portion of glass above the receiver by moving the receiver axially downward from the outlet while exerting a retractive force on the glass in and below the outlet, severing the attenuated glass at a plane close to and above the glass receiver, blowing a bubble in the glass charge thus obtained to produce a partially expanded parison, transferring the parison to a finishing mold, and blowing said parison to final form in said finishing mold.

5. In the manufacture of hollow glassware, the method of loading a parison mold having a neck finish portion which comprises disposing said parison mold below a downwardly opening discharge outlet of a container for molten glass with the neck finish portion of the mold lowermost and with the cavity of the mold axially aligned with said outlet, discharging glass downwardly from said outlet in a column having a diameter at its lower end portion sufficient to cause sealing of the upper end of the mold cavity when said column contacts therewith, preventing downward sliding movement of the surface portion of the glass column in contact with the wall of the upper portion of the mold cavity while exerting downward pressure on the glass at the interior of the column by accelerating discharge of glass through the outlet, whereby the glass entering and filling the cavity of the mold will be forced into the latter from the interior of the column, and severing the glass in the parison mold from the glass supply when the cavity of the parison mold has been completely filled.

6. The method of loading a parison mold which comprises discharging molten glass downwardly in a column until the lower end of the column contacts with and seals the upper end of the cavity of the parison mold, and then filling the cavity of the mold by forcing glass thereinto from the interior only of the column.

7. The method of filling a vertically disposed parison mold having a neck finish portion at its lower end which comprises discharging molten glass downwardly in a column from an outlet in alignment with the cavity of the mold, said column having a diameter sufficient to cause the lower end thereof to seal the upper end portion of the mold cavity on contact therewith, preventing appreciable downward movement of the surface portion of the column in contact with the wall of the upper end portion of the cavity and simultaneously forcing glass downwardly under pressure at the interior of the column to fill the mold cavity, attenuating the column of glass above the mold while maintaining close contact between the surface of the glass in the mold and the walls of the mold cavity, and severing the attenuated glass at a plane adjacent to the upper end of the mold.

8. The method of charging a parison mold which comprises disposing the mold below a downwardly opening discharge outlet of a glass container with the cavity of the mold adjacent to and in axial alignment with the outlet, the cross sectional area of said outlet being sufficient to cause the lower end portion of a descending column of glass therefrom to seal the upper end portion of the mold cavity on contact therewith, accelerating the discharge of glass from the outlet to cause the forced feeding of glass from the column through the surface portion of the glass in contact with the upper end portion of the mold cavity into the remaining portion of the cavity of the mold to fill the latter and thereafter to cause a lateral swelling of the portion of the column between the mold and the outlet, then attenuating the previously swollen portion of the column of glass by causing a retractive force on the glass in and below the outlet and simultaneously moving the filled mold downward while preventing relative movement between the glass in the mold and the walls of the latter, severing the attenuated portion of the glass below the outlet, and retracting the stub, of glass above the severing plane into the glass discharge outlet.

9. The method of loading a charge receiver having an elongate vertically disposed cavity which comprises discharging glass downwardly from a plane above the receiver in a column having a lower end portion of sufficient cross sectional area to seal the upper end portion of the cavity of the charge receiver, and causing glass at the interior of said column to pass downwardly into the cavity of the receiver at a rate higher than that which would result from the action of gravity and head pressure on such glass while the surface glass in contact with the walls of the upper end portion of the cavity is restrained by said contact against downward movement in the charge receiver.

10. The method of loading a charge receiver in a glass receiving position adjacent to and in line with a downwardly opening glass discharge outlet, comprising the steps of discharging glass downwardly from the outlet in a column having a lower end portion of sufficient cross sectional area to seal the upper end of the cavity of the charge receiver, causing glass at the interior of said column to pass downwardly into the cavity of the receiver at a rate higher than that which would result from the action of gravity and head pressure on such glass while the surface glass in contact with the walls of the cavity is restrained by said contact against downward movement in the charge receiver, and applying suction to the glass in the lower part of the mold after at least 50% of the mold loading operation has been completed.

11. The method of loading a charge receiver in a glass receiving position adjacent to and in line with a downwardly opening glass discharge outlet, comprising the steps of discharging glass downwardly from the outlet in a column having a lower end portion of sufficient cross sectional area to seal the upper end of the cavity of the charge receiver, causing glass at the interior of said column to pass downwardly into the cavity of the receiver at a rate higher than that which would result from the action of gravity and head pressure on such glass while the surface glass in contact with the walls of the cavity is restrained by said contact against downward movement in the charge receiver, applying suction to the glass in the lower part of the mold after at least 50% of the mold loading operation has been completed, severing the connecting glass between the charge receiver and the outlet after the charge has been filled, retracting the glass stub left after the severing operation into the outlet, and maintaining such stub retracted for approximately 40% to 60% of the loading period for the next succeeding charge receiver.

12. In the manufacture of hollow glassware, the method of charging an inverted mold which comprises delivering to the cavity of the mold the lower end portion of a column of molten glass of sufficient size in cross-section to seal the upper end of the mold cavity and controlling the movement in said cavity of glass from said column to effect filling of said cavity for the entire length thereof without causing sliding contact between any part of such glass and a wall of said mold cavity, and severing the glass in the mold from the supply column.

Signed at Hartford, Connecticut, this 27th day of September, 1929.

GEORGE E. ROWE.